Dec. 19, 1933.　　　　F. R. NELSON　　　　1,940,433
STOKER DRIVE TRANSMISSION
Original Filed April 18, 1931　　4 Sheets-Sheet 1

Inventor:
Floyd R. Nelson
By Wilson, Powell, McCanna & Rehm
Attys.

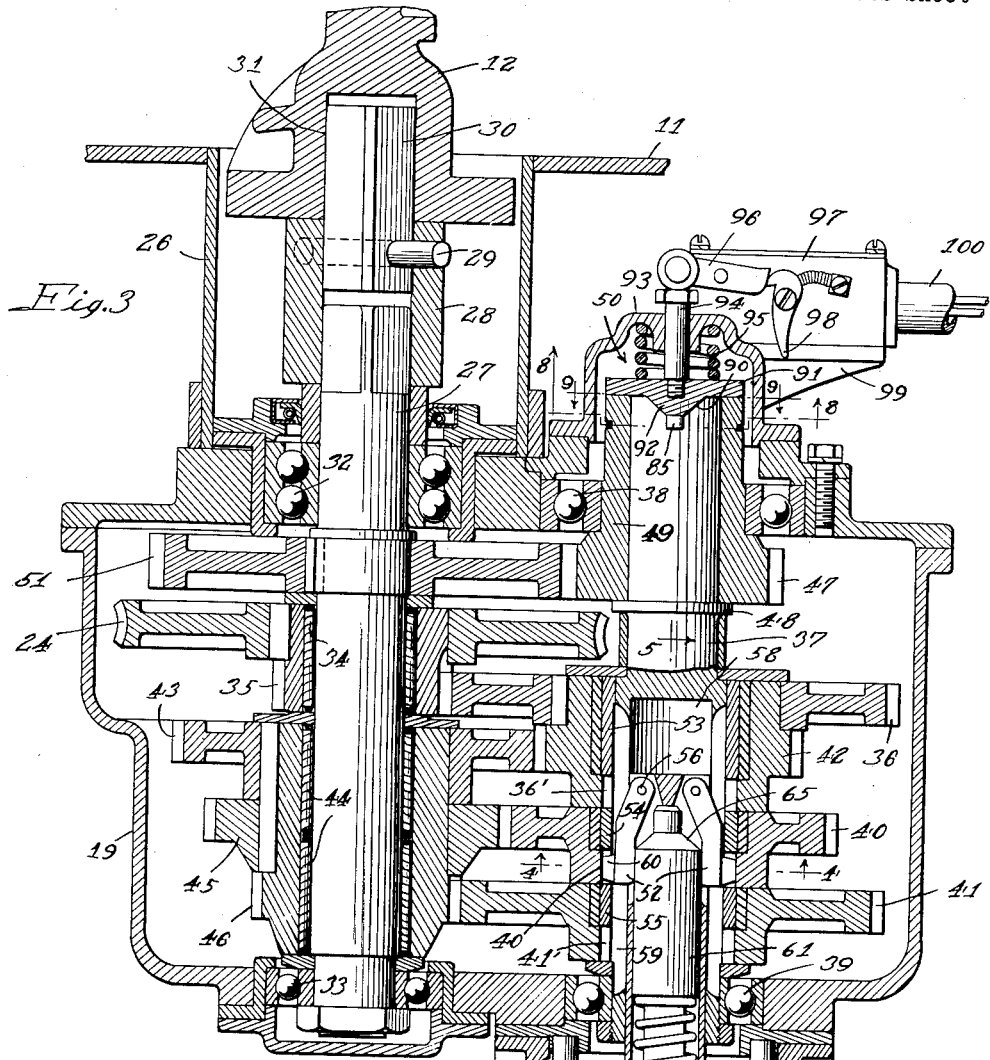

Dec. 19, 1933.  F. R. NELSON  1,940,433
STOKER DRIVE TRANSMISSION
Original Filed April 18, 1931   4 Sheets-Sheet 3
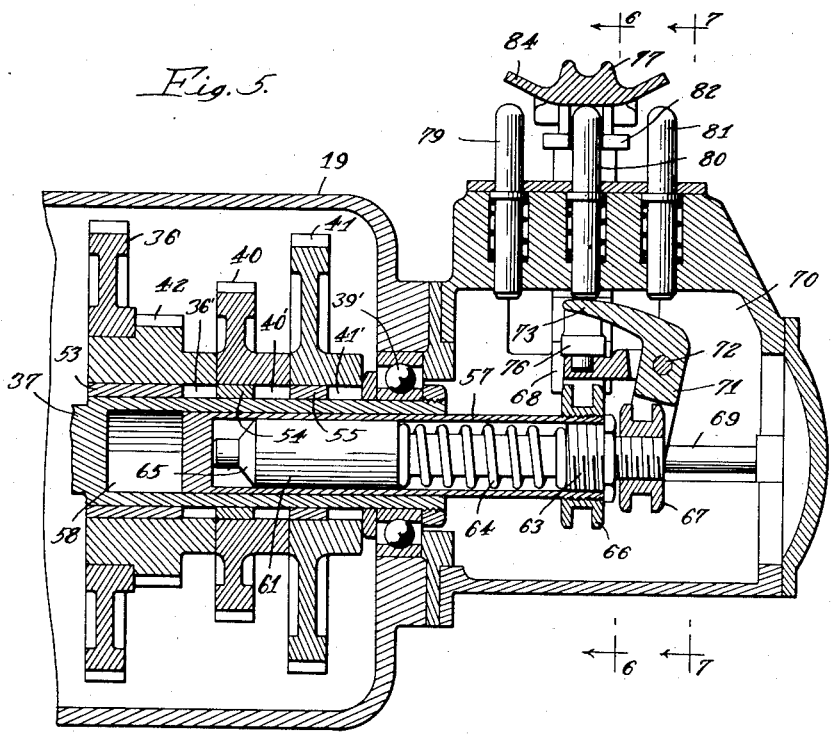
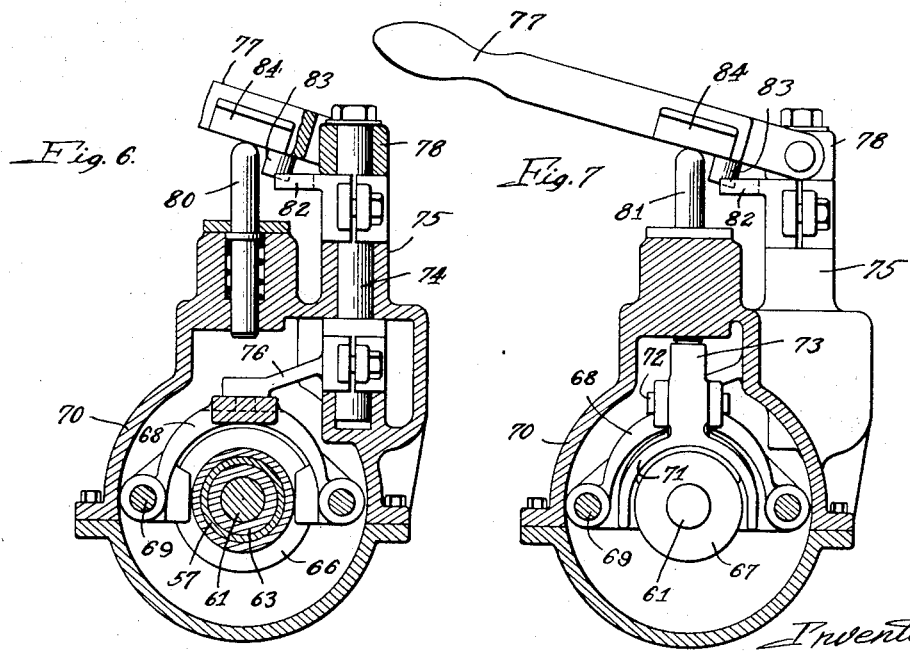
Inventor
Floyd R. Nelson
By Wilson, Dowell, McCanna + Rehm
Attys.

Dec. 19, 1933.　　　　F. R. NELSON　　　　1,940,433
STOKER DRIVE TRANSMISSION
Original Filed April 18, 1931　　4 Sheets-Sheet 4
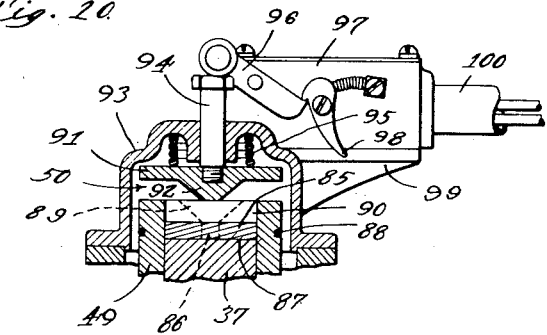
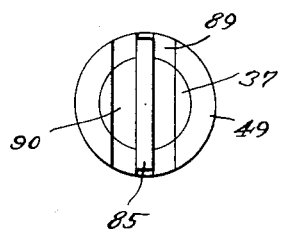
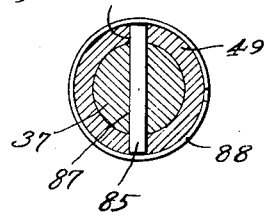
Inventor:
Floyd R. Nelson
By Wilson, Dowell, McCanna & Rehm
Attys.

Patented Dec. 19, 1933

1,940,433

UNITED STATES PATENT OFFICE 1,940,433

STOKER DRIVE TRANSMISSION

Floyd R. Nelson, Rockford, Ill., assignor to Cotta Transmission Corporation, Rockford, Ill., a corporation of Illinois Application April 18, 1931, Serial No. 531,100
Renewed November 2, 1933

12 Claims. (Cl. 74—59)

This invention relates to variable speed transmissions generally but is more particularly concerned with one especially designed to suit the requirements for a stoker drive.

The principal object of my invention is to provide a transmission of simple and economical as well as compact construction which permits a change in speed to be made smoothly and quietly without stopping the electric motor or disconnecting the stoker feed screw or other load imposed on the transmission.

In the present case, I have disclosed an arrangement in which keys are arranged to be slid into different positions by operation of a hand lever to select the particular gears for a desired speed, thus permitting the use of constantly meshed gears so that the trouble of gears clashing is obviated and smooth and quiet operation is insured. It is, therefore, another object of my invention to provide a simple and efficient form of shifting mechanism adapted for this purpose. A special feature of this mechanism lies in the use of a spring-pressed plunger for yieldingly urging the keys outwardly toward driving position and then holding the same extended positively, the said plunger being arranged to be retracted manually when a speed change is to be made and the keys being then arranged to be cammed out of driving position to retracted position.

The invention is fully described hereinafter by reference to the accompanying drawings, in which—

Fig. 3 is a horizontal section through the transmission taken on the line 3—3 of Fig. 1;

Fig. 4 is a sectional detail on the line 4—4 of Fig. 3;

Fig. 5 is a vertical section through that portion of the transmission marked by the line 5—5 of Fig. 3;

Figs. 6 and 7 are transverse vertical sections on the correspondingly numbered lines of Fig. 5;

Figs. 8 and 9 are sectional details on the correspondingly numbered lines of Fig. 3, and Fig. 10 is a sectional detail in a horizontal plane illustrating the parts of the overload release mechanism in released position.

The same reference numerals are applied to corresponding parts throughout the views.

Figure 1:
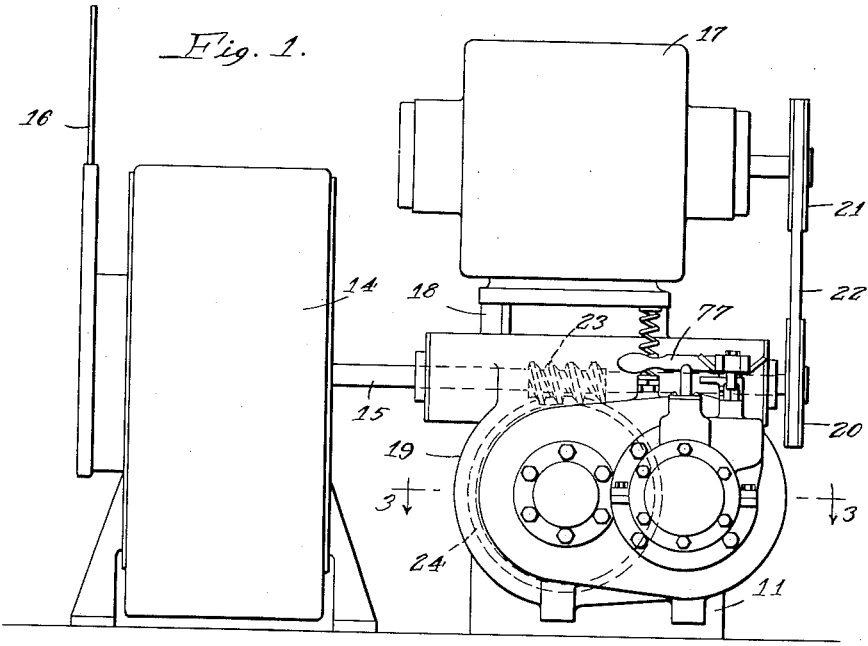
Figs. 1 and 2 are, respectively, a rear view and plan view of the drive end of a stoker equipped with a transmission made in accordance with my invention.
Figure 2:
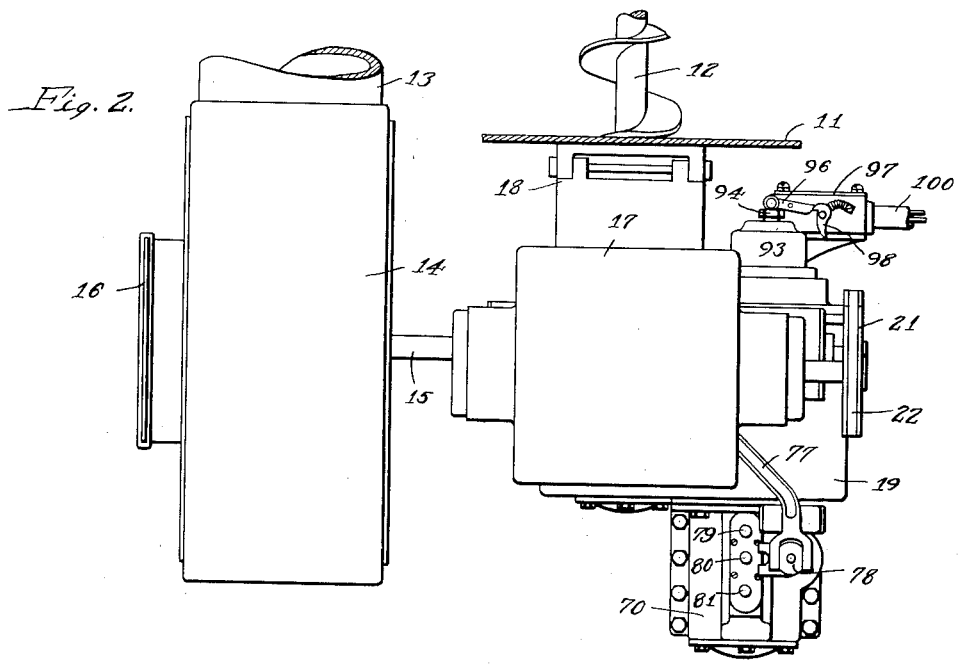

The transmission is herein illustrated as applied to the screw of a stoker of the under-feed type but it will soon be evident that the transmission is adaptable for use with other stokers and for that matter any machine requiring a similar kind of drive at variable speeds. A stoker is naturally driven at a very slow speed and provision must be made for variation of this speed through a range of, say, low, intermediate, and high, so as to meet the different operating requirements. For example, during the night a stoker can be operated with the transmission set for low speed, but in the morning when the fire bed is to be built up quickly the transmission should be shifted to high speed at least for a short time, and thereafter the transmission can be set for the intermediate speed and left to run that way throughout the day, assuming that the weather is moderately cold. In extremely cold weather it may be found necessary to keep the transmission set for high speed all day long to maintain a predetermined temperature for which a thermostat may be set. Referring to Figs. 1 and 2, the numeral 11 is applied to a portion of the hopper from which the coal is fed by the screw 12 through a suitable conduit extending forwardly from the hopper to a point under the grates of the furnace, hot water heater, or boiler. Air to support combustion is also delivered to the furnace through an air duct 13 extending forwardly from the blower 14. The rotor of the blower is operated by a shaft 15 at a constant speed, so that a shutter 16 has to be provided for the air inlet to regulate the delivery of air according to the rate of fuel delivery. A constant speed electric motor 17 furnishes the power for driving the screw 12 and blower 14 and is hingedly mounted on the base of hopper 11, as shown at 18, above the housing 19 of the transmission. The spring appearing below the motor in Fig. 1 acts against the housing 19 to keep the belt 22 under proper tension. The shaft 15 previously referred to, extends through suitable bearings in the housing 19 and has a pulley 20 on the projecting end thereof directly below a pulley 21 provided on the armature shaft of the motor 17, and a belt 22 provides a driving connection between these pulleys. This accounts for the constant speed drive of the blower. A worm 23 is provided on the shaft 15 in the housing 19 and meshes with a worm gear 24 disposed below the worm in the housing whereby to provide a reduction driving connection between the motor and the transmission. Further reductions in speed are provided for in the gearing of the transmission as hereinafter described providing for three different constant speeds of operation of the screw 12.

The housing 19 of the transmission is suitably supported from the base of hopper 11 on a large collar 26 which extends rearwardly from the bottom of the hopper 11 to the housing to enclose the rear end of the screw 12 and its coupling connection with the transmission. As shown in Fig. 3, the output or driven shaft 27 of the transmission is connected with the rear end of the screw 12 by means of a sleeve 28 which fits over the squared projecting end of the shaft 27 and is connected by means of a pin 29 to a square stub shaft 30 arranged to be received in a square socket 31 provided in the end of the screw. The shaft 27 is mounted in anti-friction bearings 32 and 33 in the opposite ends of the housing 19 and has the worm gear 24 mounted thereon by means of a roller bearing 34. A pinion 35, which is keyed to the worm gear 24, meshes with a gear 36 rotatably mounted on a countershaft 37 disposed in parallel relation to the shaft 27 and supported, as will soon appear, on anti-friction bearings 38 and 39 in the opposite ends of the housing 19. It is obvious that the gear 36 is driven at a much lower speed than the gear 24 by reason of the reduction drive shown. The gear 36 is arranged to be clutched to the shaft 37, as will soon appear, for the high speed drive. The intermediate and low speed drives are provided, respectively, by means of two other gears 40 and 41 rotatably mounted on the shaft 37. The gear 40 is driven in this way: a pinion 42 is keyed to the gear 36 and drives a gear 43 mounted as by means of roller bearings 44 on the shaft 27, and a gear 45 is keyed to the gear 43 and meshes with the gear 40. Obviously, the gear 40 turns at a much slower speed than the gear 36 by reason of the reduction drive therebetween. There is a still further reduction between the gears 36 and 41 by reason of the fact that a pinion 46, smaller than the gear 45 previously mentioned and also keyed to the gear 43, meshes with the gear 41. Leaving for later consideration the matter of how the gears 36, 40 and 41 are arranged to be individually clutched to the shaft 37 to provide the high, intermediate and low speed drives, respectively it will now be observed that a pinion 47 is received on the front end of the shaft 37 in abutment with a shoulder 48 thereon and has a reduced hub portion 49 received in the bearing 38 to provide support for the front end of the shaft 37 in said bearing. The pinion 47 is normally fixed to the end of the shaft 37 by means of an overload release mechanism, indicated generally by the numeral 50 which is hereinafter described in detail. The pinion 47 meshes with a gear 51 keyed on the front end of the output or driven shaft 27 whereby to transmit drive to the screw 12 at a further reduction in speed. The reduction afforded when the gear 41 is clutched to the shaft 37 is 1750 to 1, that is to say, with the electric motor 17 turning at 1750 R. P. M. the shaft 27 is turned 1 R. P. M. when gear 41 is clutched to the shaft 37. When the gear 40 is clutched to shaft 37 the shaft 27 is turned 2 R. P. M. and when gear 36 is clutched to shaft 37 shaft 27 is turned 3 R. P. M. It is, of course, obvious that the R. P. M. for the shaft 27 could be increased or decreased by simply changing the ratio of gears 47 and 51, or providing a motor operating at a different R. P. M. Since the screw 12 is coupled directly to the projecting end of the shaft 27 it is manifest that the screw is given one turn per minute when the gear 41 is clutched, two turns per minute when the gear 40 is clutched, and three turns per minute when the gear 36 is clutched. It will, no doubt, be appreciated that the gearing arrangement herein disclosed makes for extreme compactness, all of the gears being mounted on two shafts as against three or four otherwise provided in transmissions of this kind with which I am familiar. The thing that accounts for this compactness is the fact that the shaft 27 performs a triple function; it carries the initial driven gear 24 of the train on the roller bearing 34, the intermediate gears 43, 45 and 46 in one cluster on the roller bearings 44, and has the endmost gear 51 of the train keyed thereon. If three shafts were provided, one for each of these three functions, it is, of course, obvious to what extent the size of the housing 19 would have to be enlarged to accommodate the gearing and naturally the increased number of shafts would mean that many more bearings and mean that much more expense.

The gear 36 is arranged to be clutched to the shaft 37 by means of keys 52 arranged to enter keyways 36' provided in the hub of the gear 42 which forms a cluster with the gear 36. In a similar manner, the gear 40 is arranged to be clutched to the shaft 37 by entry of the keys 52 in keyways 40' formed in the hub of the gear 40, and the gear 41 is arranged to be clutched to the shaft by entry of the keys in keyways 41' provided in the hub of the gear 41. The gear 42 has a bronze bushing floating therein around a steel sleeve 53 pressed onto the shaft 37. The inside diameter of the sleeve is substantially flush with the inside diameter of the end portion of the hub in which the keyways 36' are formed. In a similar way, a bronze bushing floats in the hub of the gear 40 around a steel sleeve 54 pressed onto the shaft 37 next to the keyways 40', and still another bronze bushing floats in the hub of the gear 41 around another steel sleeve 55 pressed onto the shaft 37 next to the keyways 41'. The keys 52 are pivoted, as at 56, in slots provided in diametrically opposite sides of the inner end of a sleeve 57 that is slidably received in an axial bore 58 provided in the enlarged rear end of the shaft 37. The shaft 37 is slotted lengthwise of this rear end portion through diametrically opposite sides thereof, as appears at 59, and the keys 52 slide in these slots as the sleeve 57 is moved endwise in the bore 58. The keys have teeth 60 projecting outwardly from the ends thereof radially with respect to the sleeve 57 for entry in the aforesaid keyways. Thus, since the keys are entered in the slots 59 in the shaft 37 it is obvious that they will transmit drive to the shaft from whichever gear happens to be clutched in the manner indicated. The keys 52 are retractible into the sleeve 57 to disengage the teeth 60 of the keys from the keyways but are arranged to be held extended in the driving position in the manner shown in Fig. 3 by means of a plunger 61 fitting slidably in the sleeve 57. The keyways 36', 40' and 41' are all slightly wider than the teeth 60 provided on the keys 52, as appears in Fig. 4, whereby to enable the teeth to enter the keyways easily in the turning of the gears with respect to the shaft 37 from which the keys are extensible. The sides of the keyways are, furthermore, inclined, diverging inwardly, as also appears in Fig. 4, and the sides of the teeth 60 are correspondingly inclined, converging outwardly, so that when the plunger 61 is withdrawn from behind the keys 52 there is enough of a cam action of the keyways on the teeth to eject the teeth and move the keys inwardly to retracted position. In other words, the plunger 61 is arranged to hold the keys positively in driving position but when this plunger is retracted with respect to the keys the latter are automatically moved to retracted position so as to disconnect whichever gear was clutched from driving relation to the shaft 37. The plunger 61 has a reduced outer end portion 62 which projects through a bushing 63 threaded into the end of the sleeve 57, and a coiled compression spring 64 fits about the reduced portion 62 of the plunger and is confined by the bushing 63 so as to normally urge the plunger 61 inwardly toward the position shown in Fig. 3, in which position it holds the keys 52 extended in driving position. The inner end of the plunger 61 has a taper 65 thereon which is arranged to have the ends of the keys 52 ride thereon to urge the keys outwardly from retracted position toward driving position under the action of the spring 64. In shifting from one speed to another, let us say from intermediate to high, the plunger 61 is pulled out against the action of spring 64, thus allowing the keys 52 to move to retracted position for the declutching of the gear 40 from shaft 37. Then, the sleeve 57 is moved inwardly to bring the teeth 60 out of register with the keyways 40' so that they will ride on the inside of the bushing 54 when the plunger 61 is released for movement under the action of its spring 64. Thus, when the sleeve 57 is moved inwardly far enough to bring the teeth 60 into register with the keyways 36' the plunger 61 will force the keys outwardly by cam action of its end portion 65 under the pressure of the spring 64 to engage the teeth 60 in the keyways 36' and thereby clutch the gear 36 to the shaft 37. The shifting mechanism associated with the sleeve 57 and plunger 61 for operating said parts in proper relation to one another for the selection of the different speeds will now be described.

An annularly grooved collar 66 (see Fig. 5) is mounted on the outer end of the sleeve 57 and a similar collar 67 is mounted on the outer end of the plunger 61. A yoke 68 projects over the top of the sleeve 57 and is slidably mounted on a pair of rods 69 mounted in horizontal, parallel relationship in a housing 70 suitably secured to the housing 19 and enclosing the projecting rear end of the sleeve 57 and plunger 61. The yoke 68 has projections thereon fitting in the annular groove in the collar 66 so that movement of the yoke along the rods 69 produces corresponding movement of the sleeve 57. A second yoke 71 is pivoted at 72 on the yoke 68 and cooperates with the collar 67 to communicate outward movement to the plunger 61 against the action of its spring 64. The yoke 71 is arranged to be oscillated, as will soon appear, by depression of the finger 73 provided on the upper end thereof and reaching over the middle of the yoke 68. A vertical stub shaft 74 (see Fig. 6) is mounted for oscillation in a bearing 75 provided in the top of the housing 70 and on its lower end carries an arm 76 reaching under the finger 73 for a sliding pivotal connection with the yoke 68 at the middle thereof as by means of the pin and slot shown. Thus, oscillation of the shaft 74 causes reciprocation of the yoke 68. A hand lever 77 is arranged to communicate oscillatory movement to the shaft 74 and has a universal joint mounting, as indicated at 78, on the upper end of the shaft 74 to permit moving the same from the operative position shown in Fig. 1 in which it projects over a set of three plungers 79, 80 and 81 projecting from the top of the housing 70, to an out-of-the-way inoperative position, as shown in Fig. 2. A forked bracket 82 is secured to the upper end of the shaft 74 under the lever 77 and when the lever is in its operative position, as shown in Figs. 6 and 7, a pin 83 projecting downwardly from the lever is arranged to enter the fork in the bracket to provide a connection between the lever 77 and the shaft 74 so that the shaft will be oscillated by oscillation of the lever, as is thought to be self-evident. In that way, it is evident that the sleeve 57 is arranged to be reciprocated by oscillation of the lever 77. The sleeve 57 is, however, immovable so long as the plunger 61 is not pulled out to allow the keys 52 to move to retracted position, as previously explained. The pins 79, 80 and 81 are arranged to operate the yoke 71 in the three positions occupied by the yokes 68 and 71 for the three different speeds of the transmission. Each of these plungers, it will be noticed, has a spring normally holding the same projecting upwardly from the housing, as appears in Fig. 5. The plunger 80 has its lower end directly over the finger 73 when the shift mechanism is in the position for intermediate speed, as shown in Fig. 5. In the case of low speed the plunger 81 is disposed directly over the end of the finger 73, and in the case of high speed the plunger 79 is disposed over said finger. Thus, the yoke 71 is arranged to be operated by simply pressing down on the lever 77 to depress whichever plunger is then cooperating with the finger 73. That movement of the lever permits the keys 52 to move to retracted position, and the sleeve 57 is then free to be moved in either direction by oscillation of the lever. Winglike projections 84 are formed on the lever 77 near its pivoted end and project laterally therefrom in opposite directions. The purpose of these projections is to cause the depression of the next plunger in the sidewise movement of the lever 77 from one position to the next, so that the movement of the lever is not obstructed. In other words, one can move from either extreme position all the way to the other extreme position without raising the lever to clear the pins that are traversed in such movement of the lever. In operation it will, therefore, appear that in shifting, let us say from intermediate to high speed, the lever 77 is first depressed so as to oscillate the yoke 71 by means of the plunger 80 and thereby pull out the plunger 61 to allow the keys 52 to move to retracted position. Then, the lever is swung to the left, as viewed in Fig. 5, to move the sleeve 57 inwardly to bring the teeth 60 of the keys 52 out of register with the keyways 40' and bring them into approximate register with the keyways 36'. When the lever is approximately in the right position it can be raised so as to release the plunger 61 without disconnecting the lever from the sleeve 57 at 82—83 (see Fig. 7). The plunger is, therefore, released for operation thereof under the action of its spring 64 in order that the keys 52 will be under spring pressure tending to move the same to extended driving position. In that way, the keys will move into engagement with the keyways 36' with a noticeable clicking sound as soon as the sleeve 57 has been moved far enough to bring the teeth 60 into register with those keyways. Once the teeth 60 are engaged in the keyways 36' the plunger 61 holds them positively in that position to maintain the driving connection between the gear 36 and shaft 37. The lever 77 can then, if desired, be moved to the out-of-the-way position shown in Fig. 2.

The overload release mechanism 50 forms the subject matter of another application Ser. No. 585,739, filed January 9, 1932, and is illustrated in Figs. 3 and 8—10. As stated before, the mechanism 50 provides a releasable driving connection between the shaft 37 and pinion 47, the release being contingent upon excessive resistance to turning of the shaft 27. Such excessive resistance to turning may result from any one of several causes. In the case of a stoker the most common cause of a jam is the presence of a railway spike or large stone in the coal which, upon arrival at the bottom of the hopper, is apt to get stuck and prevent turning of the screw. The mechanism 50 is, furthermore, arranged as we shall see to break the motor circuit at the same time that the drive for the feed screw is disconnected. A shear pin 85, as best appears in Fig. 8, is entered through registering slots 86 and 87 provided in the hub 49 and shaft 37, respectively, and is held in place by a split ring 88 entered in an annular groove provided in the hub 49, the ring having engagement with the opposite ends of the pin as shown. The cross-section of the shear pin 85 is such that anything beyond a predetermined resistance to turning of the screw 12 will result in the ends of the pin shearing off and allowing the shaft 37 to turn relative to the hub 49 of the pinion 47. The shear pin is at the remote end of the reduction gearing with respect to the electric motor 17 so that when a jam occurs the motor, due to the reduction drive, will readily shear the pin and there will be no danger of the motor burning out. So much for the matter of how the screw 12 is disconnected from the transmission in the event of an overload. Registering V-shaped notches 89 and 90 are provided in the end of the hub 49 and shaft 37, respectively, as best appears in Fig. 9. A plate 91 is normally disposed in abutment with the end of these parts, as shown in Fig. 3, with the diametrically extending V-shaped projection 92 fitting snugly in the registering notches 89 and 90. A cap 93 detachably secured to the front end of the housing 19 and enclosing the mechanism 50, has a stud 94 slidably received in a hole at the center thereof and threaded into the center of the plate 91 to provide a mounting for the plate on the cap. A coiled compression spring 95 acts between the inside of the cap and the back of the plate to normally hold the same in abutment with the end of the hub 49 and shaft 37 with the projection 92 disposed in the notches in said parts. However, when the pin 85 shears off and the shaft 37 turns with respect to the hub 49 the plate 91 is cammed away from the shaft 37, as shown in Fig. 10, by reason of the turning of the notch 90 with respect to the projection 92. This movement of the plate 91 is utilized to break the motor circuit by having the stud 94 move a trigger 96 of a switch 97. Any suitable form of switch may be used but I prefer using a limit switch similar to those used on elevators and the like and also quite extensively used in connection with automatic trip mechanisms on machine tools. The trigger 96 is moving from the position shown in Fig. 3 to that shown in Fig. 10 is arranged to break the motor circuit, and is automatically locked in open circuit position by means of a spring pressed latch 98. The switch 97 is suitably supported by means of a bracket 99 on the side of the housing 19 and has a conduit 100 extending therefrom containing the wires forming part of the motor circuit. The switch 97 is usually referred to as the safety switch and is in series with a magnetic switch that is directly connected with the motor and a pressure control switch associated with the boiler in connection with which the stoker is used. Thus, the pressure switch automatically breaks the motor circuit to stop the stoker when the steam pressure has been raised to a predetermined point and the safety switch comes into play to break the motor circuit only in the event of an overload on the stoker. The throwing out of operation of the motor the instant an overload occurs sufficient to disconnect the stoker feed screw from the transmission is of advantage naturally from the standpoint of economy but also from the standpoint of letting the operator know when the stoker requires attention. Obviously, when the pin 85 shears off the thing that has caused that to occur must be remedied and then the cap 93, is removed and the shear pin replaced, after which the latch 98 can be released to throw the motor back into operation.

It is believed the foregoing description conveys a good understanding of all of the objects and advantages of my invention. It will, no doubt, be appreciated that various changes may be made in the present construction without seriously departing from the invention. The appended claims have, therefore, been drawn so as to cover all legitimate modifications and adaptations.

I claim:

1. In a transmission, the combination of a driven shaft, a second shaft parallel therewith, a gear on the second shaft meshing with a gear fixed on the driven shaft to turn the latter, a main driving gear rotatably mounted on the driven shaft and arranged to have operating connection with a suitable power source, a secondary gear forming a cluster with the latter gear to turn therewith, a first selective gear on the second shaft meshing with the secondary gear, another gear clustered with the first selective gear on the second shaft, a cluster of gears driven by the latter gear and rotatably mounted on the driven shaft, a second selective gear on the second shaft driven by another gear of the last mentioned cluster, and means for releasably clutching either of the two selective gears to the second shaft.

2. In a transmission, the combination of a driven shaft, a second shaft parallel therewith, a gear on the second shaft meshing with a gear fixed on the driven shaft to turn the latter, a main driving gear rotatably mounted on the driven shaft and arranged to have operating connection with a suitable power source, a secondary gear forming a cluster with the latter gear to turn therewith, a first selective gear on the second shaft meshing with the secondary gear, another gear clustered with the first selective gear on the second shaft, a cluster of gears driven by the latter gear and rotatably mounted on the driven shaft, second and third selective gears on the second shaft driven by two other gears of the last mentioned cluster, and means for releasably clutching either of the three selective gears to the second shaft.

3. In a transmission, the combination of a driven shaft, a second shaft parallel therewith, two intermeshing gears on the two shafts for driving the driven shaft from the second shaft, a main driving gear rotatably mounted on the driven shaft and arranged to be operated from a suitable power source, a first stage of reduction gears comprising a small gear on the driven shaft turning with the main driving gear, and a large first selective gear on the second shaft meshing therewith, a second stage of reduction gears comprising a small gear on the second shaft turning with the first selective gear, a gear cluster rotatably mounted on the driven shaft and including a large gear meshing with the last mentioned gear, and a small gear turning with the large gear, and a second selective gear on the second shaft meshing with the small gear of said cluster, and means for releasably clutching either of the two selective gears to the second shaft.

4. In a transmission, the combination of a driven shaft, a second shaft parallel therewith, two intermeshing gears on the two shafts for driving the driven shaft from the second shaft, a main driving gear rotatably mounted on the driven shaft and arranged to be operated from a suitable power source, a first stage of reduction gears comprising a small gear on the driven shaft turning with the main driving gear, and a large first selective gear on the second shaft meshing therewith, a second stage of reduction gears comprising a small gear on the second shaft turning with the first selective gear, a gear cluster rotatably mounted on the driven shaft and including a large gear meshing with the last mentioned gear, and a small gear turning with the large gear, and a second selective gear on the second shaft meshing with the small gear of said cluster, a third stage of reduction gears comprising a third and still smaller gear in the cluster on the driven shaft, and a third selective gear meshing therewith on the second shaft, and means for releasably clutching either of the three selective gears to the second shaft.

5. A transmission comprising, in combination, a first shaft, a second shaft parallel therewith, a main driving gear rotatably mounted on the first shaft and arranged to have operating connection with a suitable power source, a secondary gear forming a cluster with the latter gear to turn therewith, a first selective gear on the second shaft meshing with the small gear, another gear clustered with the first selective gear on the second shaft, a cluster of gears driven by the latter gear and rotatably mounted on the first shaft, a second selective gear on the second shaft driven by another gear of the last mentioned cluster, and means for releasably clutching either of the two selective gears to the second shaft, the second shaft being arranged to have a driving connection with means to be operated thereby.

6. A transmission comprising, in combination, a first shaft, a second shaft parallel therewith, a main driving gear rotatably mounted on the first shaft and arranged to have operating connection with a suitable power source, a secondary gear forming a cluster with the latter gear to turn therewith, a first selective gear on the second shaft meshing with the secondary gear, another gear clustered with the first selective gear on the second shaft, a cluster of gears driven by the latter gear and rotatably mounted on the first shaft, second and third selective gears on the second shaft driven by two other gears of the last mentioned cluster, and means for releasably clutching either of the three selective gears to the second shaft, the second shaft being arranged to have a driving connection with means to be operated thereby.

7. In a transmission, the combination of a driven shaft, a second shaft parallel therewith, a gear on the second shaft meshing with a gear fixed on the driven shaft to turn the latter, a main driving gear rotatably mounted on the driven shaft and arranged to have operating connection with a suitable power source, a secondary gear forming a cluster with the latter gear to turn therewith, a first gear on the second shaft meshing with the secondary gear, another gear clustered with the first gear on the second shaft, a cluster of gears driven by the latter gear and rotatably mounted on the driven shaft, a plurality of selective gears on the second shaft for driving the latter by meshing engagement with other gears of the last mentioned cluster, and means for selecting either of the selective gears to drive the second shaft.

8. In a transmission, the combination of a driven shaft, a second shaft parallel therewith, two intermeshing gears on the two shafts for driving the driven shaft from the second shaft, a main driving gear rotatably mounted on the driven shaft and arranged to be operated from a suitable power source, a first stage of reduction gears comprising a small gear on the driven shaft turning with the main driving gear, and a large first gear on the second shaft meshing therewith, a second stage of reduction gears comprising a small gear on the second shaft turning with the last mentioned gear, a gear cluster rotatably mounted on the driven shaft and including a large gear meshing with the last mentioned small gear, and a plurality of other gears graduated in size, each smaller than the last mentioned large gear, a plurality of selective gears for driving the second shaft by meshing engagement with the other gears of said cluster, and means for selecting either of the selective gears to drive the second shaft.

9. In a transmission, the combination of a driven shaft, a second shaft parallel therewith, a gear on the second shaft meshing with a gear fixed on the driven shaft to turn the latter, a main driving gear rotatably mounted on the driven shaft and arranged to have operating connection with a suitable power source, a secondary gear forming a cluster with the latter gear to turn therewith, a first selective gear on the second shaft meshing with the secondary gear, another gear clustered with the first selective gear on the second shaft, a cluster of gears driven by the latter gear and rotatably mounted on the driven shaft, a plurality of other selective gears on the second shaft driven by other gears of the last mentioned cluster, and means for releasably clutching either of the selective gears to the second shaft.

10. In a transmission, the combination of a driven shaft, a second shaft parallel therewith, two intermeshing gears on the two shafts for driving the driven shaft from the second shaft, a main driving gear rotatably mounted on the driven shaft and arranged to be operated from a suitable power source, a first stage of reduction gears comprising a small gear on the driven shaft turning with the main driving gear, and a large first selective gear on the second shaft meshing therewith, a second stage of reduction gears comprising a small gear on the second shaft turning with the first selective gear, a gear cluster rotatably mounted on the driven shaft and including a large gear meshing with the last mentioned gear and a plurality of other gears graduated in size, each smaller than the last mentioned large gear, and a plurality of other selective gears for driving the second shaft meshing with the last mentioned gears, and means for releasably clutching either of the selective gears to the second shaft.

11. A transmission comprising, in combination, a first shaft, a second shaft parallel therewith, a main driving gear rotatably mounted on the first shaft and arranged to have operating connection with a suitable power source, a secondary gear forming a cluster with the latter gear to turn therewith, a first selective gear on the second shaft meshing with the secondary gear, another gear clustered with the first selective gear on the second shaft, a cluster of gears driven by the latter gear and rotatably mounted on the first shaft, a plurality of other selective gears on the second shaft driven by other gears of the last mentioned cluster, and means for releasably clutching either of the selective gears to the second shaft, the second shaft being arranged to have a driving connection with means to be operated thereby.

12. A transmission comprising, in combination, a first shaft, a second shaft parallel therewith, a main driving gear rotatably mounted on the first shaft and arranged to have operating connection with a suitable power source, a secondary gear forming a cluster with the latter gear to turn therewith, a first gear on the second shaft meshing with the secondary gear, another gear clustered with the first gear on the second shaft, a cluster of gears driven by the latter gear and rotatably mounted on the first shaft, a plurality of selective gears for driving the second shaft by meshing engagement with other gears of the last mentioned cluster, and means for selecting either of the selective gears to drive the second shaft, the second shaft being arranged to have driving connection with means to be operated thereby.

FLOYD R. NELSON.

CERTIFICATE OF CORRECTION.

Patent No. 1,940,433.                                             December 19, 1933.

FLOYD R. NELSON.

It is hereby certified that error appears in the printed specification of the above numbered patent requiring correction as follows: Page 5, line 55, claim 5, for "small" read secondary; and that the said Letters Patent should be read with this correction therein that the same may conform to the record of the case in the Patent Office.

Signed and sealed this 6th day of February, A. D. 1934.

F. M. Hopkins (Seal)                                                           Acting Commissioner of Patents.